United States Patent
Numazu (10) Patent No.: US 12,187,927 B2
(45) Date of Patent: Jan. 7, 2025

(54) ADHESIVE TAPE

(71) Applicants: NITOMS, INC., Tokyo (JP); NITTO DENKO CORPORATION, Ibaraki (JP)

(72) Inventor: Yasuhiro Numazu, Tokyo (JP)

(73) Assignees: NITOMS, INC., Tokyo (JP); NITTO DENKO CORPORATION, Osaka (JP)

( * ) Notice: Subject to any disclaimer, the term of this patent is extended or adjusted under 35 U.S.C. 154(b) by 396 days.

(21) Appl. No.: 17/678,203

(22) Filed: Feb. 23, 2022

(65) Prior Publication Data
US 2022/0275248 A1 Sep. 1, 2022

(30) Foreign Application Priority Data

Feb. 26, 2021 (JP) .................................. 2021-030664

(51) Int. Cl.
*A47L 25/00* (2006.01)
*C09J 7/21* (2018.01)

(52) U.S. Cl.
CPC ............... *C09J 7/21* (2018.01); *A47L 25/005* (2013.01); *C09J 2301/204* (2020.08); *C09J 2400/283* (2013.01); *Y10T 428/15* (2015.01)

(58) Field of Classification Search
None
See application file for complete search history.

(56) References Cited

U.S. PATENT DOCUMENTS

| | | | | | |
|---|---|---|---|---|---|
| 6,127,014 | A | * | 10/2000 | McKay, Jr. | A47L 25/005 428/343 |
| 6,228,454 | B1 | * | 5/2001 | Johnson | A47K 10/16 428/43 |
| 6,368,689 | B1 | * | 4/2002 | Connor Sledge | A47K 10/16 428/43 |
| 2005/0221043 | A1 | * | 10/2005 | Williamson | A47L 25/005 428/40.1 |
| 2006/0112507 | A1 | * | 6/2006 | McKay | A47L 25/005 15/104.002 |
| 2008/0248232 | A1 | * | 10/2008 | Wu | A47L 25/005 428/43 |

FOREIGN PATENT DOCUMENTS

JP 3272710 B2 4/2002

* cited by examiner

*Primary Examiner* — Alexander S Thomas
(74) *Attorney, Agent, or Firm* — WHDA, LLP (57) ABSTRACT

Provided is an adhesive tape in which each of at least one perforation line includes: a plurality of separation parts at which one side portion and an other side portion of the adhesive tape are separated away from each other in its longitudinal direction; a connection part through which the one side portion and the other side portion are connected to each other in the longitudinal direction, the connection part located between two adjacent separation parts in a width direction of the adhesive tape; and a weak connection part through which the one side portion and the other side portion are connected to each other in the longitudinal direction, the weak connection part having a smaller breaking strength than the connection part, and the perforation line includes at least one group including the connection part and the weak connection part adjacent to each other in the width direction.

12 Claims, 7 Drawing Sheets

ADHESIVE TAPE

CROSS-REFERENCE TO RELATED APPLICATION

This application claims priority to Japanese Patent Application No. 2021-030664, filed on Feb. 26, 2021, the disclosure of which is incorporated herein by reference in its entirety.

FIELD OF THE INVENTION

The present invention relates to an adhesive tape capable of removing dust or the like on a surface of an object to be cleaned, by being brought into abutting contact with the object to be cleaned.

BACKGROUND OF THE INVENTION

Conventionally, the adhesive tape is wound in its longitudinal direction and layered to forma rolled body (see, for example, JP 3272710 B). This rolled body is rolled on a surface of an object to be cleaned, which is for example a floor surface, to cause dust or the like on the surface of the object to be attached to an adhesive layer exposed on an outer peripheral surface of the rolled body, thereby being capable of removing the dust from the surface of the object.

The adhesive tape has a perforation line connecting an end edge and the other end edge in a width direction of the adhesive tape. One side portion and the other side portion of the adhesive tape adjacent to each other in the longitudinal direction can be separated from each other along this perforation line. This configuration allows the adhesive tape covered with dust or the like and thus being less adhesive to be removed by being unwound from the rolled body and separated therefrom along the perforation line.

SUMMARY OF THE INVENTION

When the adhesive tape is perforated in a production process, a conventional method is that the adhesive tape is wound to form a rolled body, followed by being collectively perforated in a radial direction of the rolled body using a cutting blade. However, such a perforating method forms perforation lines to be located at a single position in the peripheral direction of the rolled body, and thus tends to cause dust to intrude inside the rolled body and contaminate the rolled body. The cross-sectional shape of the rolled body, which is originally a substantially true circular shape, is bent radially outward to form a substantially V shape at the perforation lines over time, and is thereby deformed to an irregular shape such as a droplet shape having a bent portion. The rolled body having such a deformed cross-sectional shape cannot be smoothly rolled on the surface of the object to be cleaned. The perforation lines disposed at the same position in the peripheral direction of all layers of the rolled body cause the adhesive tape to be hardly unwound since a user can accidentally peel two layers of the adhesive tape at once from the perforation lines. The conventional method includes these disadvantages.

In this regard, proposed is a rolled body having perforation lines disposed at different positions in the peripheral direction of the layers as in JP 3272710 B. The proposed configuration eliminates the aforementioned disadvantages. However, the configuration that the perforation lines cannot be disposed at a single position in the peripheral direction of the rolled body requires the perforation lines to be formed on an adhesive tape before being wound into a rolled body.

That is, the adhesive tape having a single sheet shape is perforated while being wound by a machine. Thus, the adhesive tape having a smaller number of connecting segments in a perforation line (i.e., segments located between perforations of the perforation line and connecting the adhesive tape in the longitudinal direction) is more likely to be broken while being wound. Once the adhesive tape is broken, the winding by a machine needs to be interrupted, which results in a reduced production efficiency of the rolled body. This problem can occur remarkably depending on some materials forming a substrate of the adhesive tape (for example, in the case where the material is recycled paper having a relatively low breaking strength). On the other hand, when the adhesive tape is in use by a user, a perforation line having a smaller number of connecting segments allows the user to cut off the adhesive tape more easily therealong. Therefore, contradictory circumstances lie in the configuration of JP 3272710 B.

In view of these circumstances, it is therefore an object of the present invention to provide an adhesive tape that is suppressed from being broken along a perforation line when the perforation line is formed in a production process and that, in contrast, can be easily broken along the perforation line when in use by a user.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An adhesive tape according to the present invention includes an elongated strip body having: an adhesive layer on one side surface of the elongated strip body; and at least one perforation line extending between one end edge and another end edge in a width direction of the elongated strip body, the adhesive tape including one side portion and an other side portion adjacent to each other in a longitudinal direction of the adhesive tape with the at least one perforation line therebetween, each of the at least one perforation line being configured to cut off the one side portion from the other side portion, in which each of the at least one perforation line includes: a plurality of separation parts at which the one side portion and the other side portion are separated away from each other in the longitudinal direction of the adhesive tape; a connection part through which the one side portion and the other side portion are connected to each other in the longitudinal direction of the adhesive tape, the connection part located between each two of the plurality of separation parts adjacent to each other in the width direction of the adhesive tape; and a weak connection part through which the one side portion and the other side portion are connected to each other in the longitudinal direction of the adhesive tape, the weak connection part having a smaller breaking strength than the connection part and located between each two of the plurality of separation parts adjacent to each other in the width direction of the adhesive tape but not at which the connection part is located, and each of the at least one perforation line includes at least one group including the connection part and the weak connection part adjacent to each other in the width direction of the adhesive tape.

The configuration can be such that the adhesive tape includes at least one group including two connection parts with at least one weak connection part disposed therebetween in the width direction of the adhesive tape.

The configuration can be such that the weak connection part is formed by half cutting in which the adhesive tape is cut into an intermediate position in a thickness direction of the adhesive tape.

The configuration can be such that the elongated strip body is wound in its longitudinal direction and layered to form a rolled body, the at least one perforation line includes a plurality of perforation lines, and the plurality of perforation lines respectively of a radially outer layer and a radially inner layer of the rolled body are displaced from each other in a peripheral direction of the rolled body.

The configuration can be such that the connection part has a dimension of 0.1 mm or more and 0.6 mm or less in the width direction of the adhesive tape.

The configuration can be such that the weak connection part has a dimension of 0.1 mm or more and 0.6 mm or less in the width direction of the adhesive tape.

The configuration can be such that the total number of the connection part and the weak connection part disposed in the width direction is 3 or more and 24 or less, among which 1 or more and 8 or less weak connection parts are disposed.

The configuration can be such that the adhesive tape further includes a substrate, the adhesive layer is formed on the substrate, and the substrate is made of recycled paper.

The configuration can be such that the elongated strip body is wound in its longitudinal direction and layered to form a rolled body, and the adhesive tape includes a mark for confirming a position of the at least one perforation line.

The configuration can be such that the elongated strip body is wound in its longitudinal direction and layered to form a rolled body, and a reinforcing tape is attached to an end in a longitudinal direction of the other side portion along each of the at least one perforation line when the one side portion is configured to be cut off from the other side portion.

The configuration can be such that the elongated strip body is wound in its longitudinal direction around a winding core and layered to form a rolled body, and a ratio of an outer diameter of the rolled body to an inner diameter of the winding core is 1.5 or more.

An adhesive tape according to the present invention includes a strip body having: an adhesive layer on one side surface of the strip body; and at least one perforation line connecting one end edge and an other end edge in a width direction of the adhesive tape to each other, the adhesive tape including one side portion and an other side portion adjacent to each other in a longitudinal direction of the adhesive tape with the at least one perforation line therebetween, the at least one perforation line being configured to cut off the one side portion from the other side portion, in which a portion at which the at least one perforation line is provided has a breaking strength of more than 15.0 N and less than 60.6N per width dimension of 160 mm.

BRIEF DESCRIPTION OF DRAWINGS

The foregoing and other features of the present invention will become apparent from the following description and drawings of an illustrative embodiment of the invention in which.

DETAILED DESCRIPTION OF THE PREFERRED EMBODIMENT

Next, the present invention will be described by way of an embodiment. An adhesive tape 1 of this embodiment includes an elongated strip body having an adhesive layer 3 on one side surface of the strip body and at least one perforation line 4 linearly extending between one end edge and the other end edge in a width direction of the elongated strip body. The adhesive tape 1 includes one side portion and another side portion adjacent to each other in a longitudinal direction of the adhesive tape with the at least one perforation line 4 therebetween, and each of the at least one perforation line 4 is configured to cut off the one side portion form the other side portion. The adhesive tape 1 is formed of a sheet-shaped substrate 2 to which the adhesive layer 3 is applied. In this embodiment, the substrate 2 is made of recycled paper. Recycled paper tends to have a smaller breaking strength than that of newly made paper (i.e., paper newly made from pulp) having the same thickness as that of the recycled paper. In a width direction of the adhesive tape 1, the adhesive layer 3 is formed to have a smaller width than that of the substrate 2. Thus, no adhesive layer 3 is formed on both end portions in the width direction of the adhesive tape 1.

Figure 1:
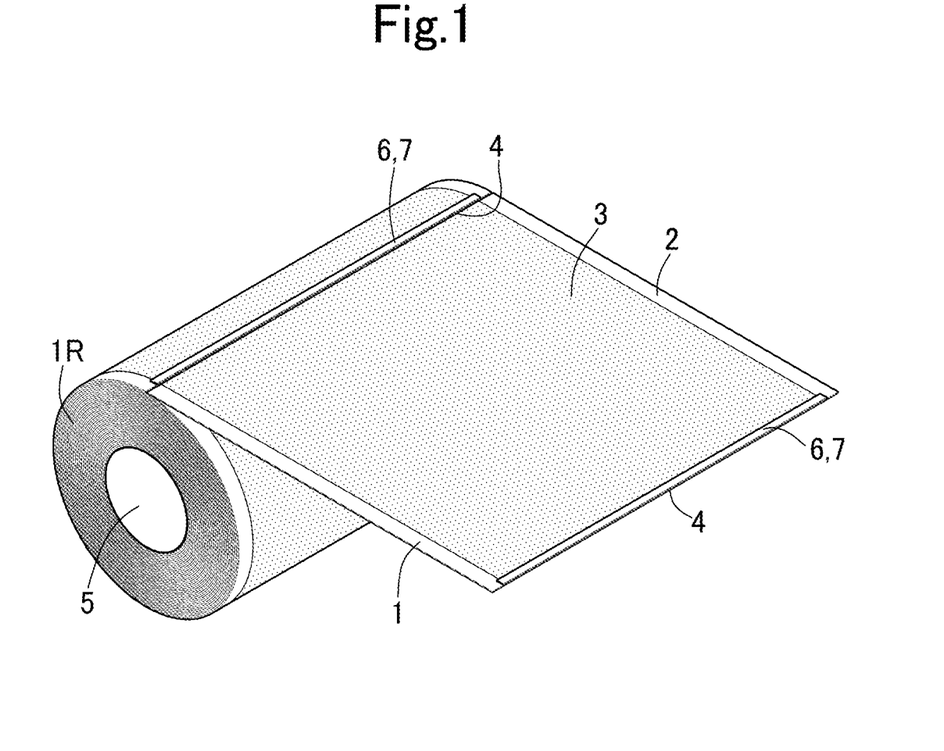
FIG. 1 is a perspective view of an adhesive tape formed into a rolled body according to one embodiment of the present invention, the view showing a state where one unit area portion of the adhesive tape forming an outermost layer is unwound from the rolled body.
Figure 2:
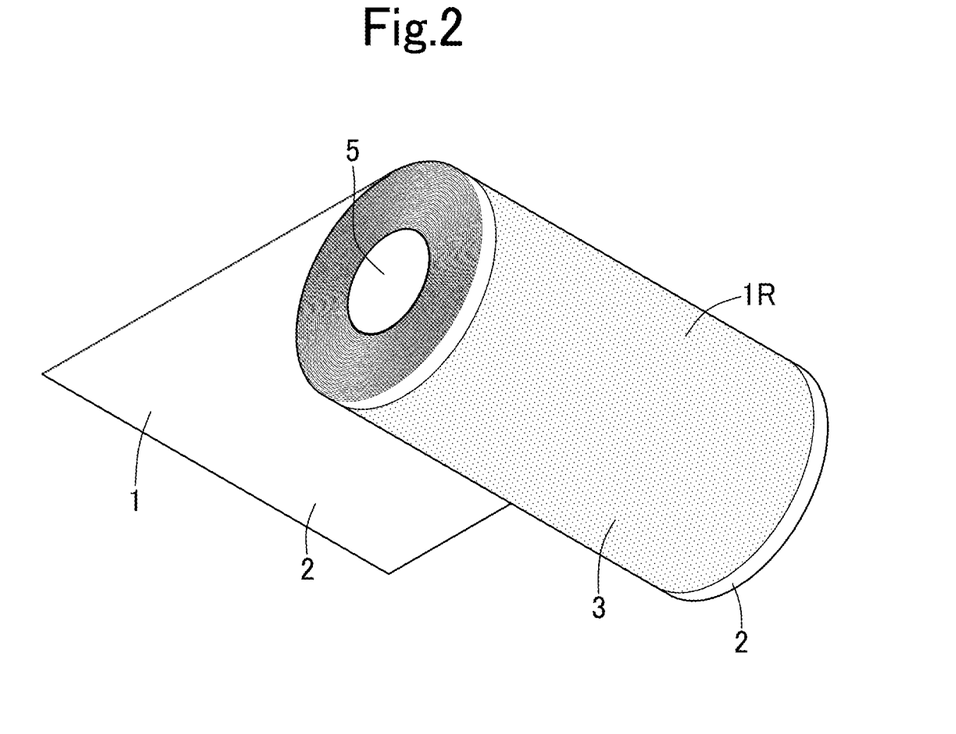
FIG. 2 is a perspective view showing an opposite side of the adhesive tape from the state in FIG. 1.
Figure 3:
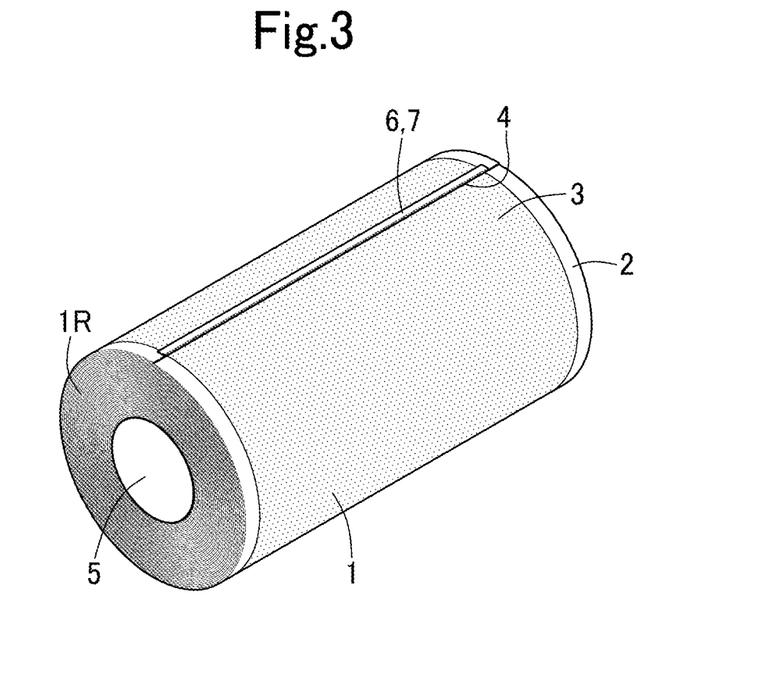
FIG. 3 is a perspective view of the adhesive tape formed into the rolled body (in the state where the portion of the adhesive tape forming the outermost layer is not unwound).

In this embodiment, the adhesive tape 1 as the strip body is wound in its longitudinal direction around a winding core 5 and layered to form a rolled body 1R as shown in FIG. 1 to FIG. 3. A ratio of the outer diameter of the rolled body 1R to the inner diameter of the winding core 5 can be 1.5 or more. In this embodiment, the ratio is about 1.8. It is also acceptable that the ratio be less than 1.5. When the ratio is 1.5 or more, tension of the adhesive tape 1 needs to be carefully controlled at the time of producing the rolled body 1R since the diameter becomes greatly different between the beginning of winding (where the diameter is substantially equal to the outer diameter of the winding core 5) and the end of winding (where the diameter equals the diameter of the rolled body 1R itself).

The rolled body 1R of this embodiment is produced by winding the adhesive tape 1 as the (single) strip body with the perforation lines 4 formed in advance. When the outer diameter of the rolled body 1 becomes larger in terms of its ratio to the inner diameter of the winding core 5, it is difficult to control tension of the strip body in the longitudinal direction during production. The tension control becomes further difficult while the perforation lines 4 are being formed on the strip body. Specifically, as aforementioned, the winding of the adhesive tape 1 tends to be particularly difficult when the ratio exceeds 1.5. In this regard, the perforation line 4 in this embodiment includes a combination of a connection part 42 and a weak connection part 43, as will be described later, to thereby increase the tensile strength of the adhesive tape 1 in the state of the strip body. Even when the ratio is large (specifically 1.5 or more), this configuration enables the adhesive tape 1 as the strip body to be more easily wound around the winding core 5 to form the rolled body 1R than an adhesive tape having perforation lines in a different form. Accordingly, this configuration allows the rolled body 1R having such a large diameter to be formed with no problem.

Figure 4:
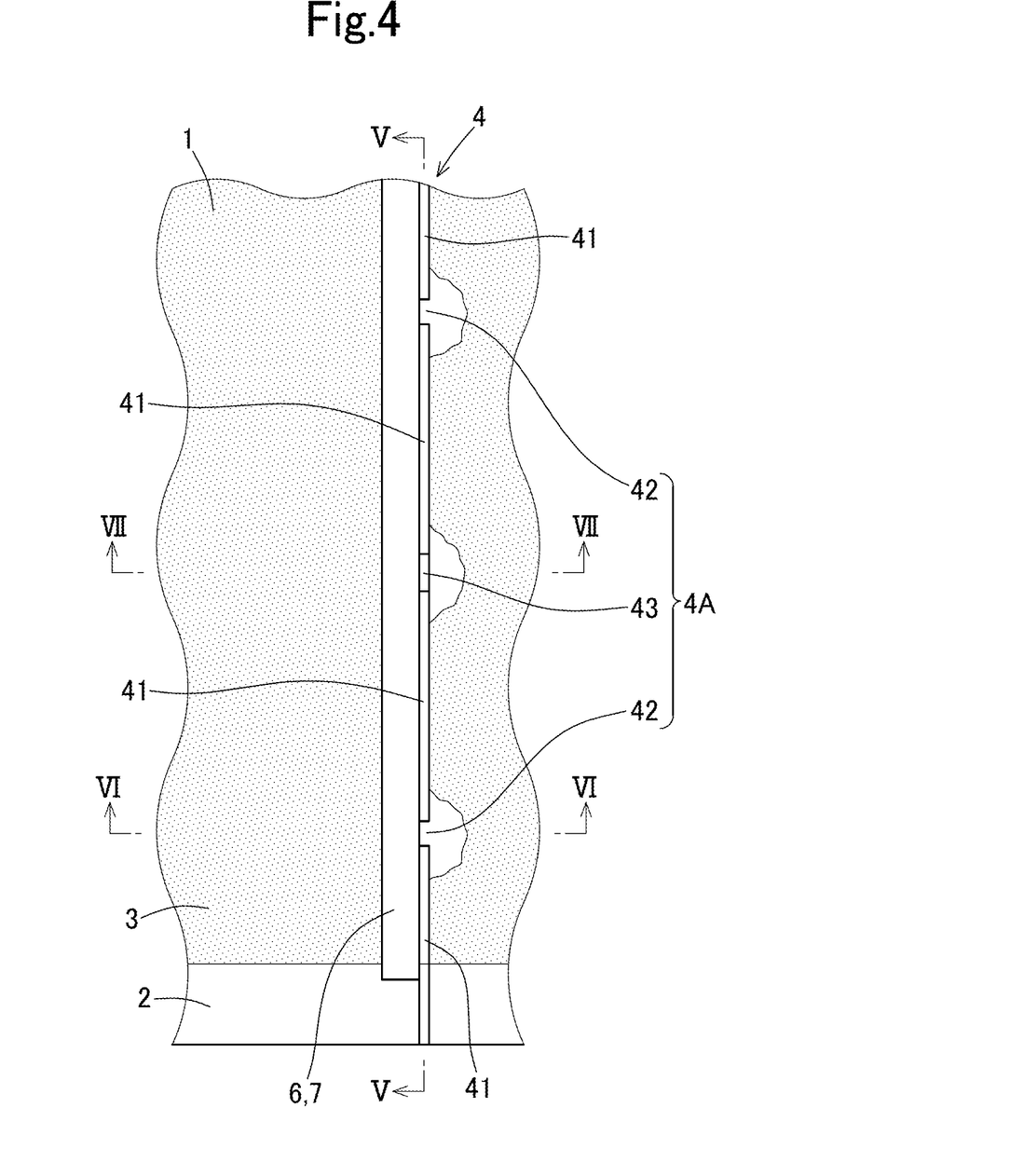
FIG. 4 is an enlarged view of a portion of a perforation line of the adhesive tape formed into the rolled body, as seen in a radial direction, the view showing connection parts and a weak connection part with an illustration of an adhesive layer therearound deleted for convenience of description.

As shown in FIG. 4, the perforation line 4 has a separation part 41, the connection part 42, and the weak connection part 43. The separation part 41 is a part at which the one side portion and the other side portion are separated (unconnected) away from each other in the longitudinal direction of the adhesive tape 1. In this embodiment, two connection parts 42 are placed with one weak connection part 43 disposed therebetween to form a group 4A (which will be described later), and the separation part 41 between one of the connection parts 42 and the weak connection part 43 has a dimension in the width direction of the adhesive tape 1 of 18.5 mm. The separation part 41 between two adjacent groups 4A has a dimension in the width direction of the adhesive tape 1 of 40 mm. The dimension of the separation part 41 is determined depending on the dimension setting of the connection part 42 and the weak connection part 43, and is thus not limited to the aforementioned values.

Figure 5:
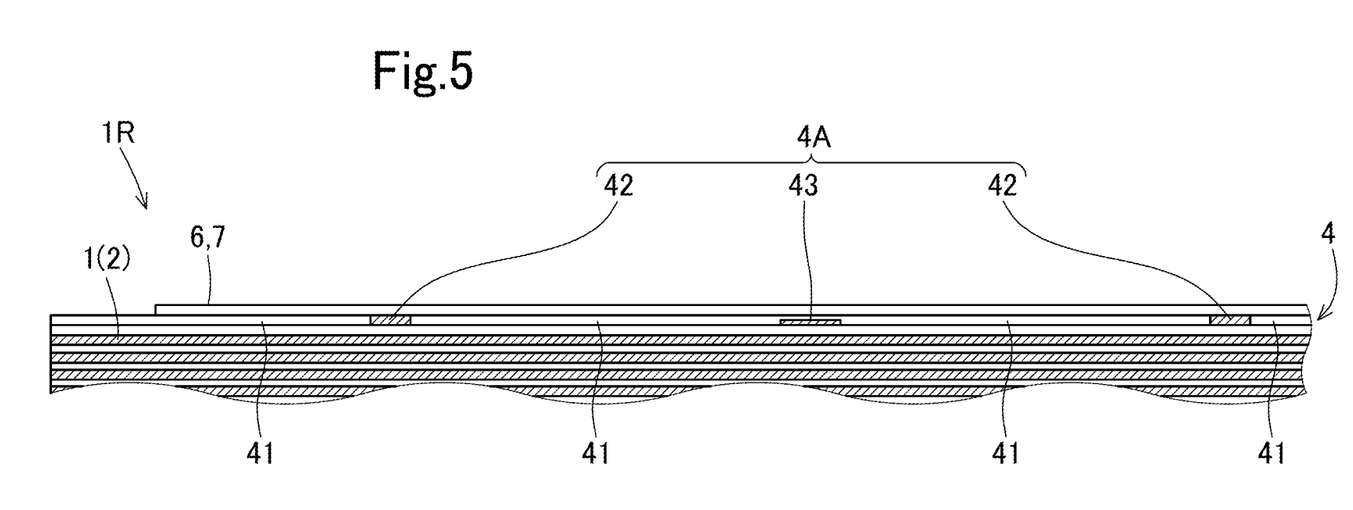
FIG. 5 is a cross-sectional view taken along line and viewed in the direction of arrows V-V thereof in FIG. 4 (highlighted in the radial direction; illustration of the adhesive layer is omitted).

The connection part 42 is located between two separation parts 41 adjacent to each other in the width direction of the adhesive tape 1, and is a part through which the one side portion and the other side portion are connected to each other in the longitudinal direction of the adhesive tape 1. In the connection part 42, the one side portion and the other side portion are thoroughly connected to each other without break in the thickness direction (see FIG. 5 and FIG. 6). The connection part 42 is formed to have a dimension range in the width direction of the adhesive tape 1 that is 0.1 mm or more and 6.0 mm or less. The dimension range is preferably 0.2 mm or more and 4.5 mm or less, further preferably 0.5 mm or more and 3.5 mm or less. In this embodiment, the dimension is set to 2.0 mm. The connection part 42 within the dimension range can produce a remarkable effect obtained by provision of the weak connection part 43.

The weak connection part 43 is a part located between each two adjacent separation parts 41 in the width direction of the adhesive tape 1, and is located at a portion at which no connection part 42 is provided. The weak connection part 43 is formed to have a dimension range in the width direction of the adhesive tape 1 that is 0.1 mm or more and 6.0 mm or less. The dimension range is preferably 0.2 mm or more and 4.5 mm or less, further preferably 0.5 mm or more and 3.5 mm or less. In this embodiment, the dimension is set to 3.0 mm. The weak connection part 43 herein is the same as the connection part 42 in the sense that they both are provided through which the one side portion and the other side portion are connected to each other in the longitudinal direction of the adhesive tape 1, but the weak connection part 43 has a smaller breaking strength than that of the connection part 42. The weak connection part 43 is formed by half cutting in which the adhesive tape 1 is cut into a radially outward intermediate position in a thickness direction of the adhesive tape 1 (see FIG. 5 and FIG. 7). The weak connection part 43 can be easily formed by the half cutting as a conventional method.

The perforation line 4 is formed by pressing a cutting blade (not shown) against the adhesive tape 1 as the strip body in the thickness direction to intermittently cut the adhesive tape 1 in the width direction. The cutting blade cuts through the entire thickness of the substrate 2 and the adhesive layer 3 at the position of the separation part 41, does not cut the substrate 2 or the adhesive layer 3 at all at the position of the connection part 42, and cuts through substantially half the thickness of the substrate 2 and the adhesive layer 3 at the position of the weak connection part 43 (it should be noted that, in FIG. 4, a line extending in the width direction of the adhesive tape 1 appears at the weak connection part 43 while no line extending in the width direction of the adhesive tape 1 appears at each of the connection parts 42). The separation part 41, the connection part 42, and the weak connection part 43 are thus formed. At the weak connection part 43, the depth of cutting in the thickness direction can be arbitrarily set.

The adhesive tape 1 has at least one group of the connection part 42 and the weak connection part 43 adjacent to each other in the width direction of the adhesive tape 1. More specifically, the adhesive tape 1 has at least one group 4A in which two connection parts 42 are disposed in the width direction of the adhesive tape 1 with at least one connection part 43 interposed therebetween. In this embodiment, the connection parts 42 and the weak connection parts 43 are arranged in the order denoted with the reference signs as "42-43-42-42-43-42". Thus, as shown in FIG. 4, the adhesive tape 1 has two groups 4A, each of which has two connection parts 42 with one weak connection part 43 interposed therebetween (i.e., each of which is formed of "42-43-42") as a repeat unit, and the two groups 4A are disposed in the width direction of the adhesive tape 1. The two connection parts 42 (having a relatively large breaking strength) are positioned on both sides of the at least one weak connection part 43 (having a relatively small breaking strength) to thereby enable the adhesive tape 1 to have balanced strength (specifically in terms of breaking strength).

The adhesive tape 1 has a total of 3 to 24 connection parts 42 and weak connection parts 43 disposed in the width direction. Among them, 1 to 8 weak connection parts 43 are provided. The number of the connection parts 42 and the number of the weak connection parts 43 are set as above to enable the adhesive tape 1 to have optimal conditions that achieve both ease of cutting off the adhesive tape 1 when in use and resistivity against breaking the adhesive tape 1 during production. In this embodiment, the total number of the connection parts 42 and the weak connection parts 43 is set to 6, among which 2 weak connection parts 43 are provided.

The breaking strength at a portion at which the perforation line 4 is disposed is set to more than 15.0 N and less than 60.6 N per width dimension of 160 mm. The range of the breaking strength is preferably 20 N or more, further preferably 25 N or more, and preferably 50 N or less, further preferably 40 N or less. The breaking strength is measured by, for example, preparing a sample of the adhesive tape 1, attaching an auxiliary plate made of, for example, cardboard to each of one side portion and the other side portion in a longitudinal direction of the sample with the perforation line 4 therebetween, and using a tensile tester chucking the auxiliary plates.

The following summarizes the results of the breaking strength test performed by the present inventor. The sample of the adhesive tape 1 having a width dimension of 160 mm was prepared, and the tensile tester was set to have a tensile speed of 300 mm/min to measure a peak value when the perforation line 4 is broken across the entire width of the sample. The measurement was performed five times for each of the samples having the same configuration. As a sample similar to this embodiment, used was a sample having a substrate formed of recycled paper laminated with polyethylene, and having four connection parts 42 (each having a length of 2 mm in the width direction of the adhesive tape 1) and two weak connection parts 43 (each having a length of 2 mm in the width direction of the adhesive tape 1). The test result with this sample revealed that the average value of the breaking strength (in N) was 29.1. The individual measured values were 27.7, 30.3, 30.6, 29.6, and 27.3. This sample had both favorable cuttability (ease of cutting off) assuming its use and favorable breakability (ease of breakage) assuming its production. The cuttability is determined based on human sensory evaluation. As to the breakability, the sample of the adhesive tape 1 that could be wound to form the rolled body 1R without breakage was evaluated as being "favorable".

As a first comparative example, on the other hand, used was a sample having a substrate formed of recycled paper laminated with polyethylene, and having four connection parts 42 (each having a length of 2 mm in the width direction of the adhesive tape 1) and no weak connection part 43. The average breaking strength was 15.0 N. The individual measured values were 13.2, 14.7, 15.4, 18.2, and 13.7. In this example, cuttability (ease of cutting off) assuming the use was favorable, but breakability (ease of breakage) assuming the production was poor (i.e., the sample easily broke). This is probably caused by no weak connection part 43 formed on the adhesive tape 1.

As a second comparative example, used was a sample having a substrate formed of recycled paper laminated with polyethylene, and having 16 connection parts 42 (each having a length of 2 mm in the width direction of the adhesive tape 1) and no weak connection part 43. The average breaking strength was 65.7 N. The individual measured values were 62.6, 55.2, 71.4, 65.6, and 73.5. As a third comparative example, used was a sample having a substrate formed of new paper (specifically pure white paper) laminated with polyethylene, and having 16 connection parts 42 (each having a length of 2 mm in the width direction of the adhesive tape 1) and no weak connection part 43. The average breaking strength was 60.6 N. The individual measured values were 55.8, 60.6, 71.0, 49.6, and 66.3. In these examples, breakability (ease of breakage) assuming the production was favorable, but cuttability (ease of cutting off) assuming the use was poor (i.e., the sample did not easily break). This is probably caused by too many connection parts 42 formed on the adhesive tape 1.

Next, the following summarizes the results of the tear strength test performed by the present inventor. A sample was prepared by cutting the adhesive tape 1 into a piece having a width of 50 mm with the perforation line 4 extending in its center (i.e., with the perforation line 4 extending at the center in the width direction of the piece). The sample includes one side and the other side in the width direction with the perforation line 4 therebetween, and the one side was chucked to the upper chuck of the tensile tester while the other side was chuck to the lower chuck of the tensile tester. The tensile speed of the tensile tester was set to 300 mm/min and the peak value at the time of breakage was measured for each of the connection parts 42 and the weak connection parts 43. The measurement was performed three times for each of the samples having the same configuration.

As a sample similar to this embodiment, used was a sample having a substrate formed of recycled paper laminated with polyethylene, and having four connection parts 42 (each having a length of 2 mm in the width direction of the adhesive tape 1) and two weak connection parts 43 (each having a length of 2 mm in the width direction of the adhesive tape 1), as in the case of the breaking strength test. The test result with this sample revealed that the average value of the tear strength (in N) at the connection parts 42 was 0.8. The individual measured values were all 0.8 in the three measurements. The average value of the tear strength (in N) at the weak connection parts 43 was 0.6. The individual measured values were all 0.6 in the three measurements.

The perforation line 4 including the weak connection parts 43 in addition to the connection parts 42 can increase the breaking strength of the adhesive tape 1 as is evident from the aforementioned test results. Further, the weak connection parts 43, which are the portions partially cut in the thickness direction by, for example, half cutting, enable the adhesive tape 1 to suppress increase in resistance against the user's cutting operation as compared with the adhesive tape 1 including a larger number of connection parts 42. This configuration can thus achieve both ease of cutting off the adhesive tape 1 when in use and resistivity against breaking the adhesive tape 1 during production. As to the resistivity against breakage during production, in order to allow the perforation lines 4 respectively of a radially inner layer and a radially outer layer of the roller body 1R (FIG. 6 and FIG. 7) to be displaced from each other in the peripheral direction, as will be described later, the adhesive tape 1 before being wound to form the rolled body 1R needs to be partially cut to form the perforation lines 4. In this case, the perforation lines 4 are formed on the adhesive tape 1 having a single sheet form, and the adhesive tape 1 may be broken due to the connection parts 42 pulled by tensile force in the longitudinal direction. When only the ease of cutting off the adhesive tape 1 by the user is taken into consideration, the number of connection parts 42 can be simply reduced. This configuration however results in a disadvantage that the adhesive tape 1 is likely to be broken during production. In this embodiment, the connection parts 42 are combined with the weak connection parts 43 to thereby make the adhesive tape 1 less likely to be broken during production while the adhesive tape 1 remains likely to be cut off when in use (i.e., while the adhesive tape 1 is suppressed from being unlikely to be cut off).

In this embodiment, the substrate 2 is made of recycled paper, which can be less strong than new paper. Even in such a case, the adhesive tape 1 configured as above can achieve both ease of cutting off when in use and resistivity against breakage during production.

The configuration with the weak connection parts 43, which are more likely to be broken than a reinforcing tape 7 to be described later when the user cuts off the adhesive tape 1 when in use, can prevent the reinforcing tape 7 from being torn with the substrate 2, and allows the adhesive tape 1 to be neatly cut off along the perforation line 4.

Figure 6:
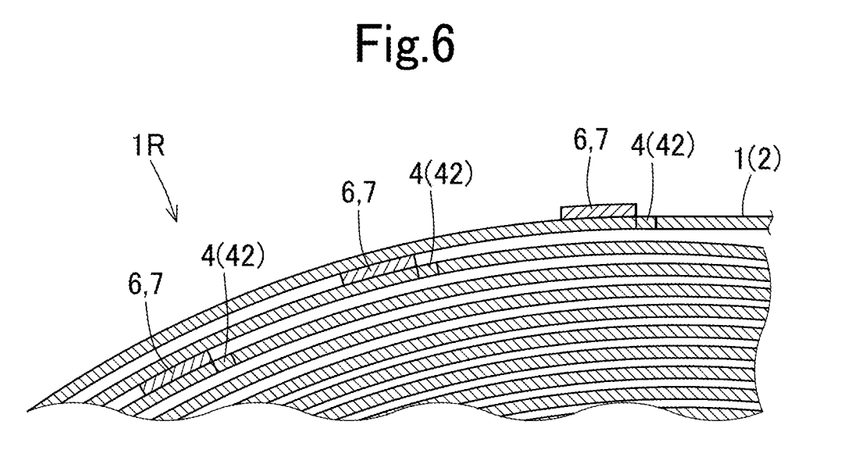
FIG. 6 is a cross-sectional view taken along line and viewed in the direction of arrows VI-VI thereof in FIG. 4 (highlighted in the radial direction; illustration of the adhesive layer is omitted).
Figure 7:
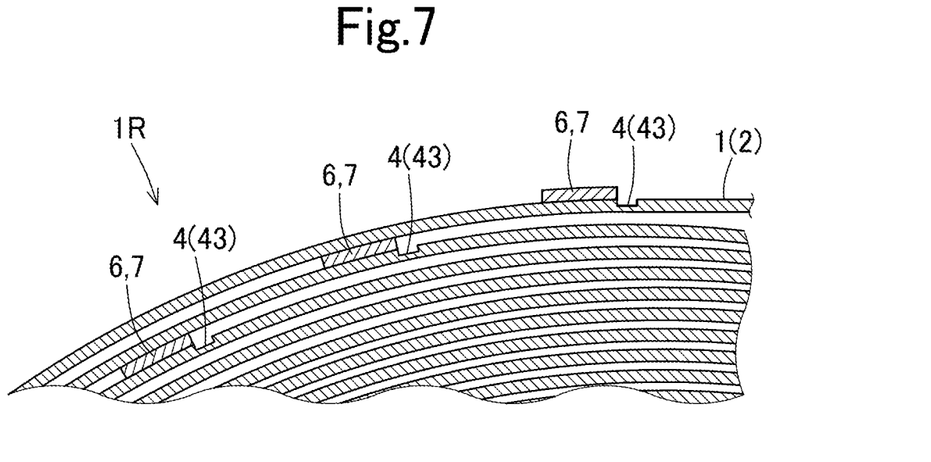
FIG. 7 is a cross-sectional view taken along line and viewed in the direction of arrows VII-VII thereof in FIG. 4 (highlighted in the radial direction; illustration of the adhesive layer is omitted).

In the rolled body 1R of this embodiment, the plurality of perforation lines 4 respectively of a radially outer layer and a radially inner layer are displaced from each other in the peripheral direction of the rolled body 1R (see FIG. 6 for the connection parts 42, and see FIG. 7 for the weak connection parts 43). In this embodiment, one unit area portion of the adhesive tape 1, that is, a portion between two adjacent perforation lines 4 has a larger length than the entire peripheral length of the rolled body 1R around which the adhesive tape 1 is wound, so that the perforation lines 4 of inner and outer layers of the rolled body 1R are displaced from each other in such a manner that the outer layer covers the perforation line 4 of the inner layer. The configuration with the perforation lines 4 displaced from each other allows the user to easily cut off the adhesive tape 1 along each perforation line 4, and can suppress the transverse sectional shape of the rolled body 1R from being deformed from the substantially true circular shape, as compared with the configuration that the perforation lines 4 are positioned to coincide with each other in the peripheral direction. Another advantage is that, even when the outer layer of the adhesive tape 1 becomes dirty with dust or the like, the inner layer of the adhesive tape 1 covered with the outer layer thereof does not become dirty.

The rolled body 1R of this embodiment includes a mark 6 for confirming the position of each perforation line 4. This mark 6 enables the user to easily find the perforation line 4 for cutting off the one side portion from the other side portion of the adhesive tape 1. The mark 6 can be provided at a position associated with each perforation line 4. For example, the mark 6 can be provided along the perforation line 4, or provided to overlap the perforation line 4. The shape or color of the mark 6 is not particularly limited. The mark 6 is formed by, for example, printing on the adhesive tape 1. The mark 6 can also be formed by another article separate from the adhesive tape 1, which is attached to the adhesive tape 1 as in the reinforcing tape 7 of this embodiment.

When the one side portion of the adhesive tape 1 is configured to be cut off from the other side portion thereof, the reinforcing tape 7 is attached along the perforation line 4 at an end in the longitudinal direction of the other side portion. The reinforcing tape 7 has a longitudinal dimension slightly smaller than the width dimension of the adhesive tape 1. In this embodiment, the width dimension of the reinforcing tape 7 is 3 mm and the thickness dimension thereof is 0.6 mm. The dimensions are not limited thereto, but can be modified variously. The portion to which the reinforcing tape 7 is attached has a larger thickness and thereby becomes more rigid to allow the user to more easily cut off the adhesive tape 1 at the perforation line 4 along the reinforcing tape 7. This reinforcing tape 7 has an elongated strip shape extending in the width direction of the adhesive tape 1 and has a different color from the substrate 2 and the adhesive layer 3 to be thereby capable of serving as the mark 6. The configuration of the portion around the reinforcing tape 7 can be modified in various forms.

One embodiment of the present invention has been described as above. However, the present invention is not limited to the aforementioned embodiment, and various modifications can be made without departing from the gist of the present invention.

For example, the substrate 2 in the aforementioned embodiment is made of recycled paper. However, the substrate 2 is not limited to this, and can be made of new paper such as pure white paper, non-woven cloth, resin film, or a sheet-shaped foam product. The surface of each of these materials can be laminated or subjected to release treatment (e.g., silicone coating).

In the aforementioned embodiment, the connection parts 42 and the weak connection parts 43 are arranged in the width direction in the order denoted with the reference signs as "42-43-42-42-43-42", and the group 4A (group as a repeat unit) including two connection parts 42 with one weak connection part 43 interposed therebetween are arranged in the order denoted as "42-43-42". However, the arrangement of the connection parts 42 and the weak connection pals 43 is not limited to this. For example, the arrangement can be "42-43-43-42", "43-42-42-43", or "42-43-42-43".

As to the configuration that the perforation lines 4 respectively of a radially outer layer and a radially inner layer of the rolled body 1R are displaced from each other in the peripheral direction, the aforementioned embodiment has been described by taking, for example, the case where one unit area portion of the adhesive tape 1, that is, a portion between two adjacent perforation lines 4 has a larger length than the entire peripheral length of the rolled body JR around which the adhesive tape 1 is wound so that each outer layer covers the perforation line 4 of each inner layer. However, in contrast, the configuration can be such that one unit area portion of the adhesive tape 1, that is, a portion between two adjacent perforation lines 4 has a smaller length than the entire peripheral length of the rolled body 1R around which the adhesive tape 1 is wound, so that the perforation lines 4 of inner and outer layers of the rolled body JR are displaced from each other in such a manner that a part of the inner layer is exposed through the outer layer at each perforation line 4.

The configurations and operational effects of the aforementioned embodiment will be hereinafter summarized. An adhesive tape 1 according to the aforementioned embodiment includes an elongated strip body having: an adhesive layer 3 on one side surface of the elongated strip body; and at least one perforation line 4 extending between one end edge and an other end edge in a width direction of the elongated strip body, the adhesive tape 1 including one side portion and an other side portion adjacent to each other in a longitudinal direction of the adhesive tape 1 with the at least one perforation line 4 therebetween, each of the at least one perforation line 4 being configured to cut off the one side portion from the other side portion, in which each of the at least one perforation line 4 includes: a plurality of separation parts 41 at which the one side portion and the other side portion are separated away from each other in the longitudinal direction of the adhesive tape 1; a connection part 42 through which the one side portion and the other side portion are connected to each other in the longitudinal direction of the adhesive tape 1, the connection part 42 located between each two of the plurality of separation parts 41 adjacent to each other in the width direction of the adhesive tape 1; and a weak connection part 43 through which the one side portion and the other side portion are connected to each other in the longitudinal direction of the adhesive tape 1, the weak connection part 43 having a smaller breaking strength than the connection part 42 and located between each two of the plurality of separation parts 41 adjacent to each other in the width direction of the adhesive tape 1 but not at which the connection part 42 is located, and each of the at least one perforation line 4 includes at least one group including the connection part 42 and the weak connection part 43 adjacent to each other in the width direction of the adhesive tape 1.

Such a configuration having the weak connection part 43 can achieve both ease of cutting off the adhesive tape 1 when in use and resistivity against breaking the adhesive tape 1 during production.

The configuration can be such that the adhesive tape 1 includes at least one group 4A including two connection parts 42 with at least one weak connection part 43 disposed therebetween in the width direction of the adhesive tape 1.

Such a configuration that the two connection parts 42 are positioned on both sides of the at least one weak connection part 43 allows the adhesive tape 1 to have balanced strength.

The configuration can be such that the weak connection part 43 is formed by half cutting in which the adhesive tape 1 is cut into an intermediate position in a thickness direction of the adhesive tape 1.

Such a configuration that the half cutting as a conventional method can easily form the weak connection part 43.

The configuration can be such that the elongated strip body is wound in its longitudinal direction and layered to form a rolled body 1R, the at least one perforation line 4 includes a plurality of perforation lines 4, and the plurality of perforation lines 4 respectively of a radially outer layer and a radially inner layer of the rolled body 1R are displaced from each other in a peripheral direction of the rolled body 1R.

Such a configuration facilitates the cutting off along each perforation line 4 and can suppress the transverse sectional shape of the rolled body 1R from being deformed from the substantially true circular shape, as compared with the configuration that a plurality of perforation lines 4 are positioned to coincide with each other in the peripheral direction of the rolled body 1R.

The configuration can be such that the connection part 42 has a dimension of 0.1 mm or more and 0.6 mm or less in the width direction of the adhesive tape 1.

Such a configuration can produce a remarkable effect of providing the weak connection part 43 if the connection part 42 falls within this range of dimension.

The configuration can be such that the weak connection part 43 has a dimension of 0.1 mm or more and 0.6 mm or less in the width direction of the adhesive tape 1.

Such a configuration can produce a remarkable effect of providing the weak connection part 43 in combination with the connection part 42 if the weak connection part 43 falls within this range of dimension.

The configuration can be such that the total number of the connection part 42 and the weak connection part 43 disposed in the width direction is 3 or more and 24 or less, among which 1 or more and 8 or less weak connection parts 43 are disposed.

Such a configuration allows the adhesive tape 1 to have optimal conditions that achieve both ease of cutting off the adhesive tape 1 when in use and resistivity against breaking the adhesive tape 1 during production.

The configuration can be such that the adhesive tape 1 further includes a substrate 2, the adhesive layer 3 is formed on the substrate 2, and the substrate 2 is made of recycled paper.

Although recycled paper is sometimes less strong than new paper, such a configuration still allows the adhesive tape 1 to achieve both ease of cutting off when in use and resistivity against breakage during production.

The configuration can be such that the elongated strip body is wound in its longitudinal direction and layered to form a rolled body 1R, and the adhesive tape 1 includes a mark 6 for confirming a position of the at least one perforation line 4.

Such a configuration allows a user to easily find the at least one perforation line 4 in order to cut off the one side portion from the other side portion.

The configuration can be such that the elongated strip body is wound in its longitudinal direction and layered to form a rolled body 1R, and a reinforcing tape 7 is attached to an end in a longitudinal direction of the other side portion along each of the at least one perforation line 4 when the one side portion is configured to be cut off from the other side portion.

Such a configuration allows the portion to which the reinforcing tape 7 is attached to become hard, and thus allows the adhesive tape 1 to be more easily cut off along each of the at least one perforation line 4.

The configuration can be such that the elongated strip body is wound in its longitudinal direction around a winding core 5 and layered to form a roiled body 1R, and a ratio of an outer diameter of the rolled body 1R to an inner diameter of the winding core 5 is 1.5 or more.

Such a configuration can form the rolled body 1R even having a large diameter.

An adhesive tape according to the aforementioned embodiment includes a strip body having: an adhesive layer 3 on one side surface of the strip body; and at least one perforation line 4 connecting one end edge and an other end edge in a width direction of the adhesive tape 1 to each other, the adhesive tape 1 including one side portion and an other side portion adjacent to each other in a longitudinal direction of the adhesive tape 1 with the at least one perforation line 4 therebetween, the at least one perforation line 4 being configured to cut off the one side portion from the other side portion, in which a portion at which the at least one perforation line 4 is provided has a breaking strength of more than 15.0 N and less than 60.6 N per width dimension of 160 mm.

Such a configuration that the breaking strength at the portion at which the at least one perforation line 4 is provided is set to fall within this range can both suppress the adhesive tape 1 from being broken along the perforation line 4 and facilitate the user's cutting off via the perforation line 4 when in use.

As described above, the aforementioned embodiment suppresses the adhesive tape 1 from being broken along the perforation line 4 when the perforation line 4 is formed in the production process, and enables the user to easily cut off the adhesive tape 1 along the perforation line 4 when in use.

The adhesive tape 1 of this embodiment is as described above. However, the present invention is not limited thereto, and the design can be appropriately modified within the scope intended by the present invention. The operational advantage of the present invention is also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

What is claimed is:

1. An adhesive tape comprising an elongated strip body having: an adhesive layer on one side surface of the elongated strip body; and at least one perforation line extending between one end edge and an other end edge in a width direction of the elongated strip body, the adhesive tape comprising one side portion and an other side portion adjacent to each other in a longitudinal direction of the adhesive tape with the at least one perforation line therebetween, each of the at least one perforation line being configured to cut off the one side portion from the other side portion, wherein each of the at least one perforation line comprises:
a plurality of separation parts at which the one side portion and the other side portion are separated away from each other in the longitudinal direction of the adhesive tape;
a connection part through which the one side portion and the other side portion are connected to each other in the longitudinal direction of the adhesive tape, the connection part located between each two of the plurality of separation parts adjacent to each other in the width direction of the adhesive tape; and
a weak connection part through which the one side portion and the other side portion are connected to each other in the longitudinal direction of the adhesive tape, the weak connection part having a smaller breaking strength than the connection part and located between each two of the plurality of separation parts adjacent to each other in the width direction of the adhesive tape but not at which the connection part is located,
each of the at least one perforation line comprises at least one group comprising the connection part and the weak connection part adjacent to each other in the width direction of the adhesive tape, and
the weak connection part is formed by half cutting in which the adhesive tape is cut into an intermediate position in a thickness direction of the adhesive tape.

2. The adhesive tape according to claim 1, comprising at least one group comprising two connection parts with at least one weak connection part disposed therebetween in the width direction of the adhesive tape.

3. The adhesive tape according to claim 1, wherein the elongated strip body is wound in its longitudinal direction and layered to form a rolled body,
the at least one perforation line comprises a plurality of perforation lines, and
the plurality of perforation lines respectively of a radially outer layer and a radially inner layer of the rolled body are displaced from each other in a peripheral direction of the rolled body.

4. The adhesive tape according to claim 1, wherein the connection part has a dimension of 0.1 mm or more and 0.6 mm or less in the width direction of the adhesive tape.

5. The adhesive tape according to claim 4, wherein the total number of the connection part and the weak connection part disposed in the width direction is 3 or more and 24 or less, among which 1 or more and 8 or less weak connection parts are disposed.

6. The adhesive tape according to claim 1, wherein the weak connection part has a dimension of 0.1 mm or more and 0.6 mm or less in the width direction of the adhesive tape.

7. The adhesive tape according to claim 6, wherein the total number of the connection part and the weak connection part disposed in the width direction is 3 or more and 24 or less, among which 1 or more and 8 or less weak connection parts are disposed.

8. The adhesive tape according to claim 1, further comprising a substrate, wherein the adhesive layer is formed on the substrate, and the substrate is made of recycled paper.

9. The adhesive tape according to claim 1, wherein the elongated strip body is wound in its longitudinal direction and layered to form a rolled body,
the adhesive tape comprising a mark for confirming a position of the at least one perforation line.

10. The adhesive tape according to claim 1, wherein the elongated strip body is wound in its longitudinal direction and layered to form a rolled body, and
a reinforcing tape is attached to an end in a longitudinal direction of the other side portion along each of the at least one perforation line when the one side portion is configured to be cut off from the other side portion.

11. The adhesive tape according to claim 1, wherein the elongated strip body is wound in its longitudinal direction around a winding core and layered to form a rolled body, and
a ratio of an outer diameter of the rolled body to an inner diameter of the winding core is 1.5 or more.

12. An adhesive tape comprising a strip body having: an adhesive layer on one side surface of the strip body; and at least one perforation line connecting one end edge and an other end edge in a width direction of the adhesive tape to each other, the adhesive tape comprising one side portion and an other side portion adjacent to each other in a longitudinal direction of the adhesive tape with the at least one perforation line therebetween, the at least one perforation line being configured to cut off the one side portion from the other side portion, wherein
each of the at least one perforation line comprises:
a plurality of separation parts at which the one side portion and the other side portion are separated away from each other in the longitudinal direction of the adhesive tape;
a connection part through which the one side portion and the other side portion are connected to each other in the longitudinal direction of the adhesive tape, the connection part located between each two of the plurality of separation parts adjacent to each other in the width direction of the adhesive tape; and
a weak connection part through which the one side portion and the other side portion are connected to each other in the longitudinal direction of the adhesive tape, the weak connection part having a smaller breaking strength than the connection part and located between each two of the plurality of separation parts adjacent to each other in the width direction of the adhesive tape but not at which the connection part is located,
the weak connection part is formed by half cutting in which the adhesive tape is cut into an intermediate position in a thickness direction of the adhesive tape, and
a portion at which the at least one perforation line is provided has a breaking strength of more than 15.0 N and less than 60.6 N per width dimension of 160 mm.

* * * * *